United States Patent Office 3,364,282
Patented Jan. 16, 1968

3,364,282
CROSSLINKED INSOLUBLE COPOLYMERS AND PROCESS OF PREPARATION FROM LINEAR SOLUBLE POLYMERS
Gaetano F. D'Alelio, South Bend, Ind., assignor, by direct and mesne assignments, to Dal Mon Research Co., Cleveland, Ohio, a corporation of Delaware
No Drawing. Continuation of application Ser. No. 300,939, Aug. 8, 1963. This application Dec. 15, 1966, Ser. No. 602,104
9 Claims. (Cl. 260—881)

ABSTRACT OF THE DISCLOSURE

This invention comprises a polymerisable mixture as well as the infusible, insoluble copolymer produced therefrom, comprising 80–99.5% of a preformed linear polymer formed by anionic polymerization of a polyunsaturated monomer such as allyl acrylate, and 0.5–20% of a specified polar monomer, typical of which is acrylic acid. The solubility of the starting polymer and its adaptability to add on a large number of the polar monomeric groups results in the production of copolymers of improved adhesiveness.

---

This invention is a continuation of my copending application Ser. No. 300,939, now abandoned.

This invention is concerned with improvements in crosslinked polymers derived from linear, fusible and soluble convertible vinyl-type polymers. In general, it deals with improving the bonding characteristics of these polymers in the infusible, insoluble state for use in coatings, adhesives and in the preparation of laminated and other bonded, reinforced and fabricated structures.

The soluble, fusible convertible polymers used in the practice of this invention may be described generally as having the structural unit,

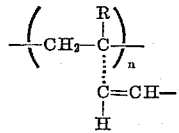

which are the linear, anionic polymerization products of vinyl monomers (A) containing one

group responsive to anionic or base catalyzed initiation, and at least one other —CH=CH— group not polymerizable under anionic conditions. Such a monomer is allyl acrylate, $CH_2=CHCOOCH_2CH=CH_2$. When this is subjected to anionic polymerization, the linear polymer,

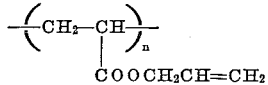

is obtained. Such polymerizations are described in U.S. Patent 2,500,265.

Linear, soluble, fusible polymers of this type are convertible to the insoluble, infusible polymers by heat alone but preferably in the presence of a radical generating catalyst such as benzoyl peroxide. Similarly, copolymers containing this type of repeating unit are also convertible to the insoluble, infusible state.

However, the number and type of copolymers that can be prepared by anionic polymerization is limited only to those monomers and comonomers which do not react with and thereby destroy the anionic initiator used to prepare the polymer. For example, allyl acrylate cannot be copolymerized anionically with acrylic or methacrylic acid to linear convertible polymers by means of the well-known anionic initiators such as sodium, potassium, lithium, lithium butyl, sodium ketyls, etc., because the catalysts react with and are destroyed by the acids before polymerization can occur.

However, monomers such as allyl acrylate can be copolymerized readily with a large number of other neutral monomers (B) which do not destroy the anionic initiator, such as methyl acrylate, ethyl acrylate, propyl acrylate, methyl methacrylate, ethyl methacrylate, hexyl methacrylate, acrylonitrile, methacrylonitrile, vinyl methylketone, styrene, α-methyl styrene, vinyl naphthalene, N-dimethyl acrylamide, vinylidene cyanide, butadiene, isoprene, 2-phenyl butadiene, 1,3, etc., as well as less readily with a variety of other monomers containing one or more negative substituents such as vinyl acetate, vinyl propionate, vinyl benzoate, dimethyl fumarate, diethyl fumarate, diallyl fumarate, dimethyl itaconate, diethyl itaconate, etc. Unconverted comonomer can be removed by distillation or by precipitation of the polymer, or be allowed to remain admixed with the linear, soluble, fusible copolymerization product and subsequently cured by copolymerization with the monomer contained therein.

In many applications, specifically modified convertible polymers and copolymers of the type used in the practice of this invention are advantageous and even necessary, as in the cases where improved adhesion of the convertible polymer to metals, glass, ceramic, wood, etc. surfaces is required. Illustrative of such modified linear polymers are, for example, those containing oxirane,

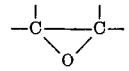

groups as derived from a glycidyl acrylate modification. As indicated hereinabove, copolymers of this type cannot be prepared by an anionic copolymerization of, for example, allyl acrylate and acrylic acid because of the destruction of the initiator. However, a radical initiated polymerization produces insoluble, infusible copolymers as does also the radical initiated copolymerization of allyl acrylate with glycidyl acrylate. Similarly, the anionic copolymerization of allyl acrylate and glycidyl acrylate produce insoluble, infusible copolymers because, while both acrylic moieties are polymerized and the allyl group is not polymerized, the epoxy group responds to and is polymerized by bases, leading to crosslinked copolymerization products. To be useful as adhesives, bonding agents, etc., the polymers must be soluble and fusible. I have discovered, however, that such modification can be made by copolymerizing preformed polymers of the type used in the practice of this invention with monomers (C) that critically modify the resulting insoluble, infusible polymerization mass when improved adhesive bonds are required.

It is known that the linear soluble, fusible polymers and copolymers of the type represented by poly(allyl acrylate) copolymerize with certain (B) monomers such as diethyl fumarate, vinyl acetate, vinyl methyl ketone, styrene, acrylonitrile, diallyl fumarate and methyl acrylate to produce insoluble, infusible products. Monomers of this type do not increase the adhesive properties of the polymer product.

The linear poly(allyl acrylate) type of polymer have also been used in minor portions of 0.1 to 5.0% as crosslinking agents for acrylic and methacrylic acid in the preparation of ion exchange resins to insoluble, crosslinked copolymers. Ion exchange resins of this type are obviously unsuitable as adhesives due to their insolubility and to their particulate, infusible structures. The intermediate mixture before polymerization is likewise an unsatisfactory, very fluid, non-adhesive composition consisting of 95 to 99.9% of liquid, volatile acrylic (B.P. 141.9° C.) or methacrylic acid (B.P. 163° C.) in the major portion.

It is therefore an object of this invention to prepare crosslinked insoluble polymer products of convertible polymers and copolymers of the type represented by poly(allyl acrylate) which have improved adhesion obtained by copolymerizing such polymers, under conditions of free radical polymerization, with minor amounts, of the order of 0.5 to 20% of a monomer (C) having at least one polymerizable

group, and at least another group capable of improving the adhesive or bonding properties. These (C) monomers are more fully defined hereinafter.

The linear, soluble, fusible poly(allyl acrylate) is representative of a large number of convertible polymers prepared by the anionic polymerization of monomers (A) having one base catalyzable

group and another base non-catalyzable

group so that the derived polymers and copolymers have a

repeating unit in the backbone of the polymer chain to which is attached a pendant

group, polymerizable by radical initiation, thus

To be responsive to anionic polymerization, the

group must be activated by an electronegative group which is directly attached to it. Such groups are the —CN groups, the —COO— group and the aryl groups, as illustrated in the acrylates, such as $CH_2=CHCOO-$,

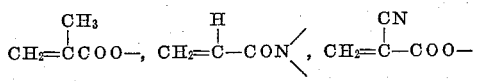

and in the vinyl aryl compounds such as

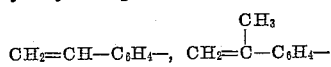

$CH_2=CHC_{10}H_6-$. The base non-catalyzable ethylenic group,

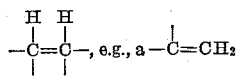

group, can be attached to this

group in any fashion provided the electronegative influence is diminished so that it does not polymerize under anionic conditions. This requirement is met by interposing at least one other atom between both groups, as for example, by inserting at least one carbon atom, thus,

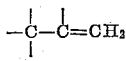

In other cases, a hetero-atom such as oxygen, sulfur and nitrogen will accomplish the same objective. The failure to interpose an atom between these groups will cause the production of crosslinking polymers. For example, divinyl benzene will produce crosslinked polymers when base catalyzed, but vinyl allylbenzene and vinylbenzene vinyl ether produce linear polymers with pendant unreacted allyl and vinyl ether groups, respectively, under the same conditions. Accordingly, if the base non-catalyzable alkenyl group attached directly or indirectly to the

group contains at least three carbon atoms, and the

group is activated electronegatively by —CN, —COO—,

and aryl groups, linear anionic polymers will be obtained, and the mode or manner of attachment of the base non-catalyzable alkenyl group to the base catalyzable

group is of no consequence to the purpose of this invention. The bond between both groups may be direct as in $CH_2=CHCOOCH_2CH=CH_2$, or indirect as in

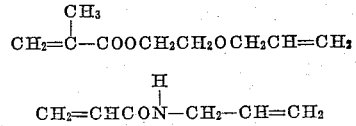

as illustrated in examples of the compounds used in the practice of this invention.

The linear, soluble, fusible poly(allyl acrylate) used in the practice of this invention is derived, as previously indicated, by the anionic polymerization of allyl acrylate monomer. Polymers of this type are disclosed in U.S. Patent 2,500,265, Mar. 14, 1950. Allyl acrylate is illustrative of a large number of acrylic monomers (A), from which, by anionic polymerization, are prepared polymers suitable for the practice of this invention, which monomers have the general formula,

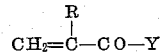

wherein R is a radical selected from the class of H, —$CH_3$, and —CN; Y represents —OR″ and

wherein R″ is selected from the class of alkenyl, alkenylaryl, alkenyloxyalkyl, alkenylthioalkyl, alkenyloxyaryl, and alkenylthioaryl radicals containing three to ten carbon atoms and possessing a terminal

group, and R′ is a radical containing 1–10 carbon atoms selected from the class consisting of hydrocarbon, alkenyloxyalkyl, alkenylaryl, alkenylthioalkyl, alkenyloxyaryl and alkenylthioaryl radicals, said alkenyl radicals containing at least 3 carbon atoms.

Other

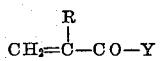

monomers, besides allyl acrylate, which are suitable for the practice of this invention, individually or in mixtures thereof, include, but not limited thereto:

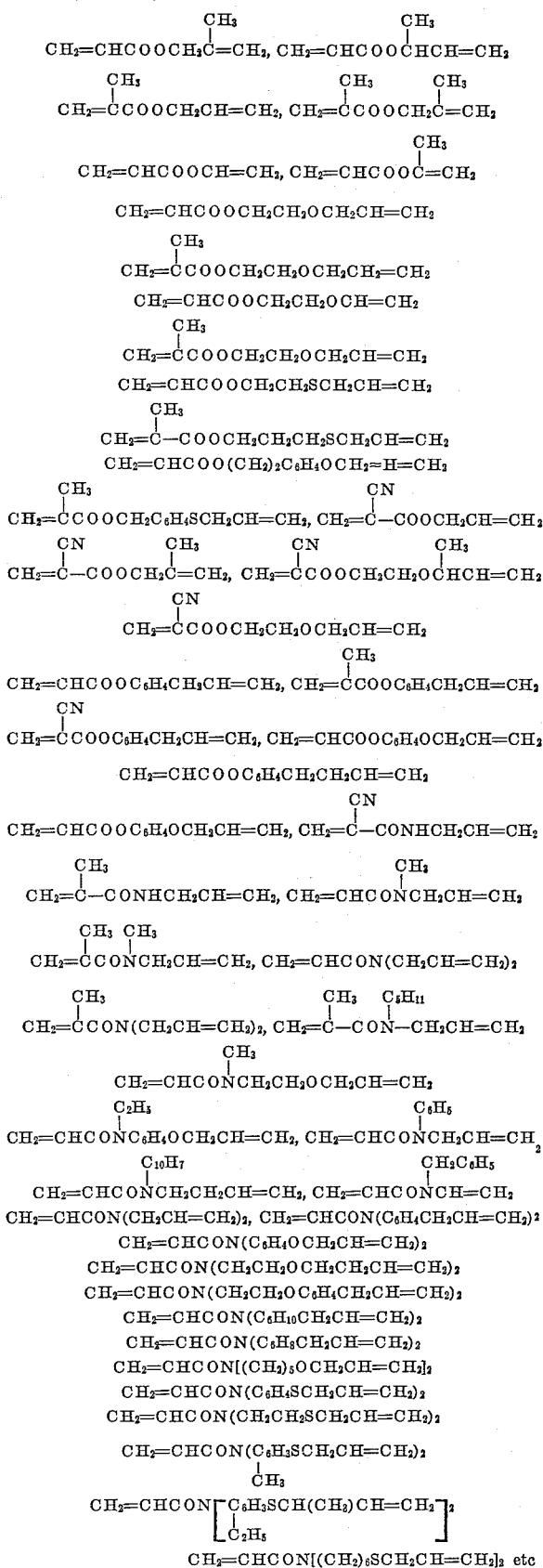

These acrylic monomers, CH₂=CHCOY, in which Y represents OR″, are easily and readily prepared using the well-known methods of classical organic chemistry. The esters can be prepared using an acrylic anhydride and the appropriate alcohol, thus:

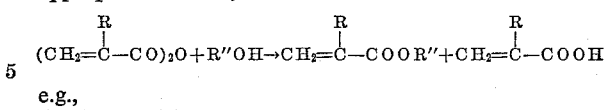

e.g., (CH₂=CHCO)₂O + CH₂=CHCH₂OH →
　　CH₂=CHCOOCH₂CH=CH₂ + CH₂=CHCOOH and

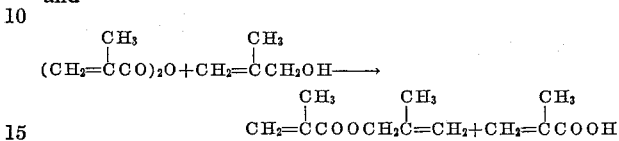

Instead of the anhydride the acid chloride can be used, particularly in the presence of a hydrohalide acceptor (HAC), thus

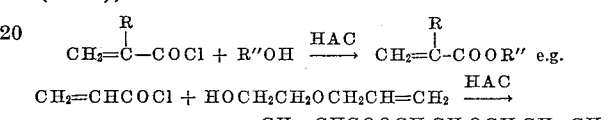

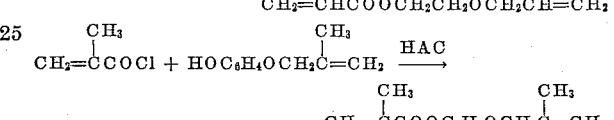

Alternately, these ester monomers can be prepared by the reaction

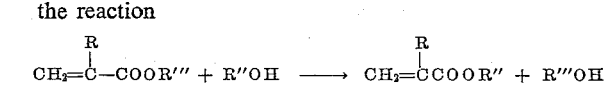

wherein R‴ represents hydrogen and an alkyl group containing one to twelve carbon atoms. However, for the purpose of this invention, the lower esters such as the methyl and ethyl esters, are preferred, e.g.,

CH₂=CHCOOCH₃ + CH₂=CHCH₂OCH₂CH₂OH →
　　CH₂=CHCOOCH₂CH₂OCH₂CH=CH₂

The acrylic monomers CH₂=CHCO—Y in which Y represents

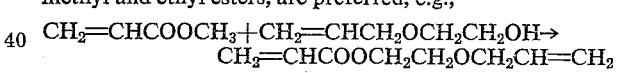

are substituted amides. These are also prepared using well-known methods of classical organic chemistry. The amides are prepared by using the acrylyl anhydride and the appropriate amine, thus

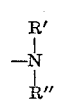

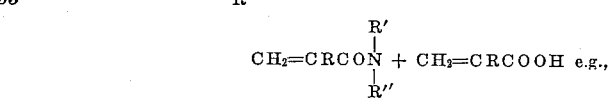

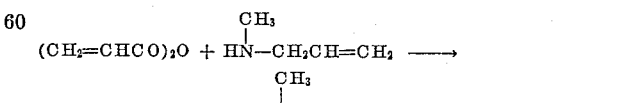

Instead of the anhydride, the corresponding acid chlorides can be used, thus

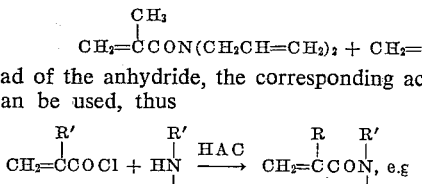

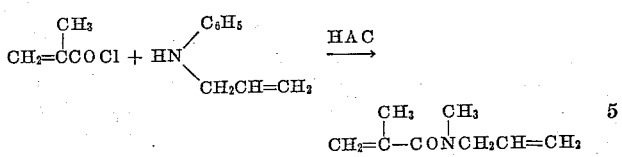

$$CH_2=\overset{CH_3}{\underset{|}{C}}COCl + HN\overset{C_6H_5}{\underset{CH_2CH=CH_2}{\diagdown}} \xrightarrow{HAC}$$

$$CH_2=\overset{CH_3}{\underset{|}{C}}-CON\overset{CH_3}{\underset{|}{C}}H_2CH=CH_2$$

Likewise the corresponding amines can be used, in which the R' and R'' groups are the alkenyloxyalkyl, alkenylaryl, alkenyloxyaryl, alkenylthioalkyl, alkenylthioaryl groups as described and illustrated above.

The anionic polymerization products of these monomers have the repeating unit

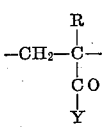

in their structures. Another class of polymers having the repeating unit

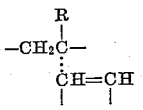

suitable for the practice of this invention are those polymers derived from the anionic polymerization of monomers having the formula

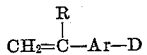

and are alkenyl aryl derivatives, wherein R represents hydrogen, $CH_3$ and CN, Ar represents an arylene radical, that is, arylene hydrocarbon, bis-arylene oxide and bis-arylene amine, containing 6 to 12 carbon atoms, and D is a radical selected from the class of —Y, —COY, —$(CH_2)_nY$, —$(CH_2)_nCOY$, and Y represents —OR'' and

wherein R' and R'' are as defined above, and $n$ represents a numerical value of 1 to 6. Polymers of this latter type and method of preparation are disclosed and claimed in applicant's copending application, Ser. No. 300,902 filed the same date herewith, now Pat. No. 3,335,119.

A few illustrative examples of the arylene, —Ar—, group are

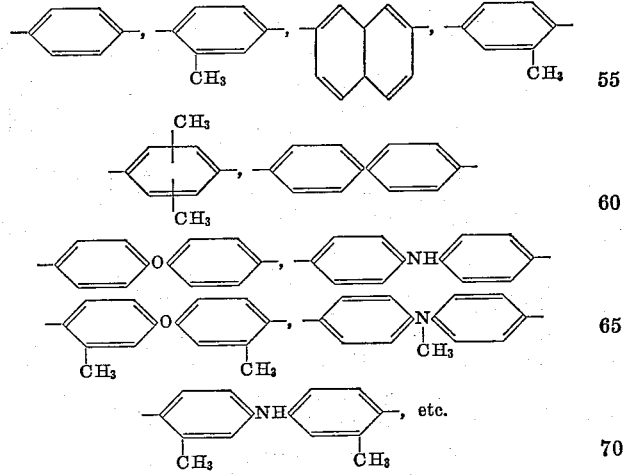

Monomers of the formula

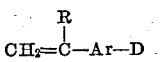

are illustrated by but not limited to, the following examples

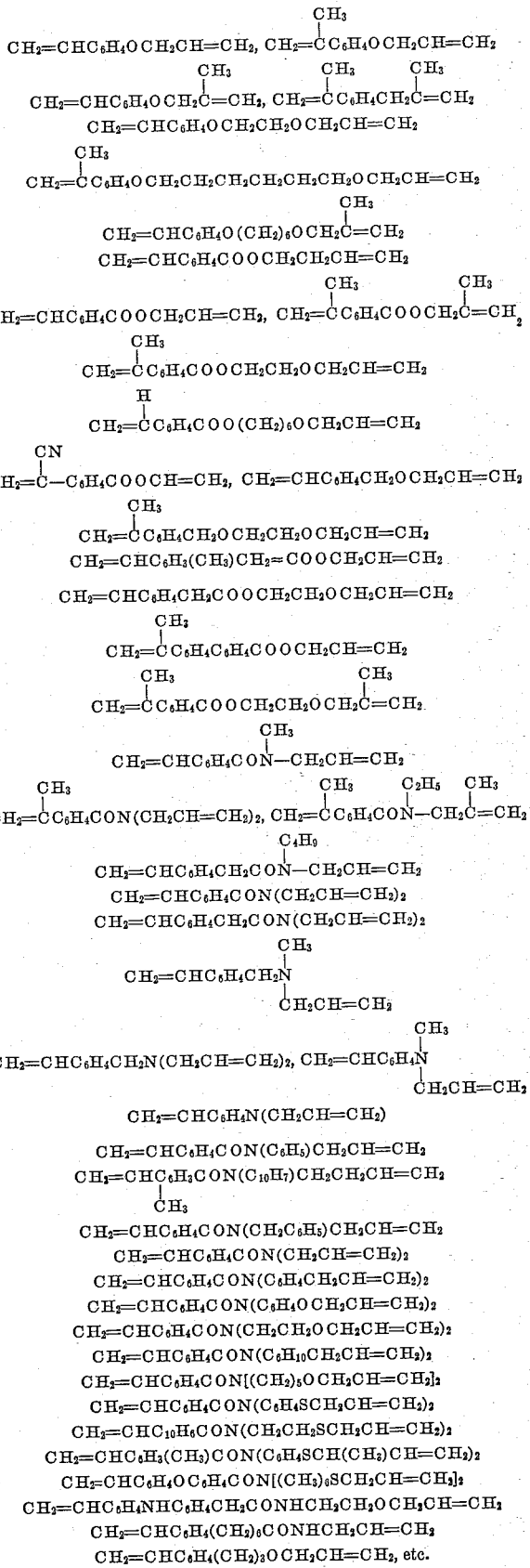

The alkenyl aryl monomers

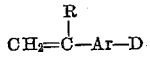

can be readily prepared by well-known methods of classical organic chemistry. For example, when D represents OR'', as in the ethers, the monomers are readily prepared using an appropriate phenol and a R'' halide in the presence of alkali, thus $$CH_2=\overset{R}{\underset{|}{C}}-Ar-OH + R''X \xrightarrow{NaOH} CH_2=\overset{R}{\underset{|}{C}}-Ar-OR''  \text{ e.g.}$$

$$CH_2=CHC_6H_4OH + CH_2=\overset{CH_3}{\underset{|}{C}}CH_2Cl \xrightarrow{NaOH}$$

$$CH_2=CHC_6H_4OCH_2\overset{CH_3}{\underset{|}{C}}=CH_2 \text{ and}$$

$$CH_2=\overset{CH_3}{\underset{|}{C}}C_6H_4OH + CH_2=CHCH_2Br \xrightarrow{KOH}$$

$$CH_2=\overset{CH_3}{\underset{|}{C}}C_6H_4OCH_2CH=CH_2$$

When D in these monomers is —COOR'', they are readily prepared by using an alkenylaryl acyl chloride and the appropriate R''OH alcohol in the presence of a hydrohalide acceptor (HAC). Thus, $$CH_2=\overset{R}{\underset{|}{C}}-Ar-COCl + R''OH \xrightarrow{HAC} CH_2=\overset{R}{\underset{|}{C}}-Ar-COOR'' \text{ e.g.}$$

$$CH_2=CHC_6H_4COCl + CH_2=CHCH_2OH \xrightarrow{HAC}$$

$$CH_2=CHC_6H_4COOCH_2CH=CH_2 \text{ and}$$

$$CH_2=\overset{CH_3}{\underset{|}{C}}C_6H_4COCl + CH_2=\overset{CH_3}{\underset{|}{C}}CH_2OCH_2CH_2OH \xrightarrow{HAC}$$

$$CH_2=\overset{CH_3}{\underset{|}{C}}C_6H_4COOCH_2OCH_2\overset{CH_3}{\underset{|}{C}}=CH_2$$

Instead of the acid chlorides, the corresponding anhydrides $$(CH_2=\overset{R}{\underset{|}{C}}-ArCO)_2O$$

can be used.

When D in the monomers $$CH_2=\overset{R}{\underset{|}{C}}-Ar-D$$

represents —(CH$_2$)$_n$OR'', they are easily prepared using the appropriate alkenyl benzyl chloride and the appropriate alkali metal alcoholate of the R''OH alcohol, thus $$CH_2=\overset{R}{\underset{|}{C}}-Ar-(CH_2)_nCl + R''OM \longrightarrow$$

$$MCl + CH_2=\overset{R}{\underset{|}{C}}-Ar(CH_2)_nOR''  \text{ e.g.}$$

$$CH_2=CHC_6H_4CH_2Cl + NaOCH_2CH=CH_2 \longrightarrow$$

$$NaCl + CH_2=CHC_6H_4CH_2OCH_2CH=CH_2$$

$$CH_2=\overset{CH_3}{\underset{|}{C}}C_6H_4CH_2Cl + NaOCH_2CH_2OCH_2\overset{CH_3}{\underset{|}{C}}=CH_2 \longrightarrow$$

$$NaCl + CH_2=\overset{CH_3}{\underset{|}{C}}C_6H_4OCH_2CH_2OCH_2\overset{CH_3}{\underset{|}{C}}=CH_2$$

When D in the monomers $$CH_2=\overset{R}{\underset{|}{C}}-Ar-D$$

represents —(CH$_2$)$_n$COOR'', then the monomers can be readily prepared using the appropriate alkenylaryl acyl chloride, and the R''OH alcohol in the presence of a hydrohalide acceptor, thus $$CH_2=\overset{R}{\underset{|}{C}}-Ar-(CH_2)_nCOCl + R''OH \xrightarrow{HAC}$$

$$CH_2=\overset{R}{\underset{|}{C}}-Ar-(CH_2)_nCOOR'' \text{ e.g.}$$

$$CH_2=CHC_6H_4CH_2COCl + CH_2=CHCH_2OH \xrightarrow{HAC}$$

$$CH_2=CHC_6H_4COOCH_2CH=CH_2$$

$$CH_2=\overset{CH_3}{\underset{|}{C}}C_6H_4CH_2COCl + CH_2=\overset{CH_3}{\underset{|}{C}}CH_2OCH_2CH_2OH \xrightarrow{HAC}$$

$$CH_2=\overset{CH_3}{\underset{|}{C}}C_6H_4CH_2COOCH_2CH_2OCH_2\overset{CH_3}{\underset{|}{C}}=CH$$

The acid chlorides $$CH_2=\overset{R}{\underset{|}{C}}-Ar(CH_2)_nCOCl$$

are obtained by reacting the alkenyl benzyl halides with KCN following which the nitriles are saponified to acids and converted to the acid chloride with SOCl$_2$. Instead of the acid chlorides, the corresponding anhydrides $$(CH_2=\overset{R}{\underset{|}{C}}-Ar(CH_2)_nCO)_2O$$

can be used.

When D in the monomers represents $$-\overset{R'}{\underset{\underset{R''}{|}}{N}}$$

the monomers are readily prepared by alkylating an alkenyl anilide with the halides of R' and R'', thus $$CH_2=\overset{R}{\underset{|}{C}}-Ar-NH_2 + R'X \longrightarrow CH_2=\overset{R}{\underset{|}{C}}-Ar\overset{R'}{\underset{|}{N}}H \xrightarrow{R''X}$$

$$CH_2=\overset{R}{\underset{|}{C}}-Ar-\overset{R'}{\underset{\underset{R''}{|}}{N}}, \text{ e.g.,}$$

$$CH_2=CHC_6H_4NH_2 + C_4H_9Br \longrightarrow$$

$$CH_2=CHC_6H_4\overset{H}{\underset{|}{N}}C_4H_9 \xrightarrow{CH_2=CHCH_2Br}$$

$$CH_2=CHC_6H_4N\overset{C_4H_9}{\underset{CH_2CH=CH_2}{}}$$

and $$CH_2=\overset{CH_3}{\underset{|}{C}}C_6H_4NH_2 + 2 CH_2=CHCH_2Cl \longrightarrow$$

$$CH_2=\overset{CH_3}{\underset{|}{C}}C_6H_4N(CH_2=CH_2)_2$$

When D represents $$-\text{CON}\overset{R'}{\underset{R''}{}} \text{ or } -(CH_2)_n\text{CON}\overset{R'}{\underset{R''}{}}$$

then the monomer is readily prepared by using the appropriate alkenyl aryl acid chloride and the amine $$H\overset{R'}{\underset{R^{IV}}{N}}, \text{ thus } CH_2=\overset{R}{\underset{|}{C}}ArCOCl + H\overset{R'}{\underset{R^{IV}}{N}} \xrightarrow{HAC} CH_2=\overset{R}{\underset{|}{C}}ArCON\overset{R'}{\underset{R''}{}} \text{ and}$$

$$CH_2=\overset{R}{\underset{|}{C}}Ar(CH_2)_nCOCl + H\overset{R'}{\underset{R''}{N}} \xrightarrow{HAC}$$

$$CH_2=\overset{R}{\underset{|}{C}}Ar(CH_2)_nCON\overset{R'}{\underset{R''}{}}, \text{ e.g.,}$$

$$CH_2=CHC_6H_4COCl + HN\overset{CH_3}{\underset{CH_2CH=CH_2}{}} \longrightarrow$$

$$CH_2=CHC_6H_4CON\overset{CH_3}{\underset{CH_2CH=CH_2}{}}$$

$$CH_2=CHC_6H_4COCl + H(NCH_2CH=CH_2)_2 \longrightarrow$$

$$CH_2=CHC_6H_4CON(CH_2CH=CH_2)$$

$$CH_2=\overset{CH_3}{\underset{|}{C}}C_6H_4COCl + C_6H_5NHCH_2CH=CH_2 \longrightarrow$$

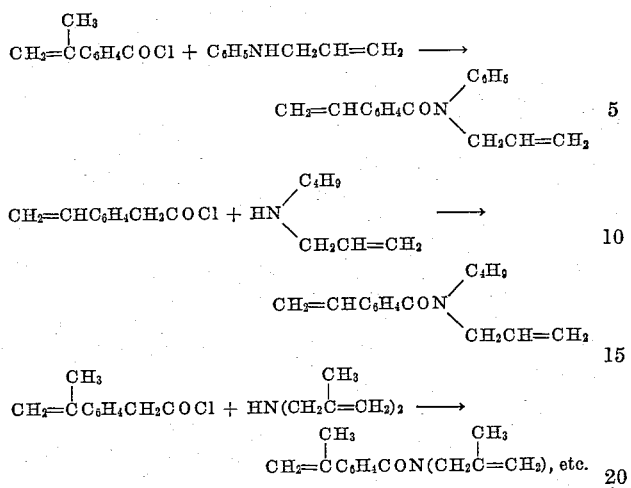

$$CH_2=CHC_6H_4CH_2COCl + HN\begin{matrix}C_4H_9\\CH_2CH=CH_2\end{matrix} \longrightarrow$$

$$CH_2=CHC_6H_4CON\begin{matrix}C_4H_9\\CH_2CH=CH_2\end{matrix}$$

$$CH_2=\overset{CH_3}{\underset{|}{C}}C_6H_4CH_2COCl + HN(CH_2\overset{CH_3}{\underset{|}{C}}=CH_2)_2 \longrightarrow$$

$$CH_2=\overset{CH_3}{\underset{|}{C}}C_6H_4CON(CH_2\overset{CH_3}{\underset{|}{C}}=CH_2)_2, \text{ etc.}$$

Instead of the acid chlorides, the corresponding anhydrides, $$(CH_2=\overset{R}{\underset{|}{C}}-Ar-CO)_2O \text{ and } (CH_2=\overset{R}{\underset{|}{C}}-Ar(CH_2)_nCO)_2$$

can be used in the synthesis of the monomers.

The anionic polymerization product of the $$CH_2=\overset{R}{\underset{|}{C}}-Ar-D$$

monomers, alone or in the presence of other monomers, have the repeating unit

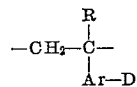

in their structures.

By an anionic polymerization is meant a polymerization in which the propagation of the polymer chain occurs through a carbanion. This may be illustrated by rewriting the monomers $$CH_2=\overset{R}{\underset{|}{C}}\quad \text{and}\quad CH_2=\overset{R}{\underset{|}{C}}\quad,\text{as}\quad CH_2=\overset{R}{\underset{|}{C}}$$
$$\quad\quad\overset{}{\underset{COR}{}}\qquad\qquad\overset{}{\underset{Ar-D}{}}\qquad\qquad\overset{}{\underset{R_a}{}}$$

wherein $R_a$ represents —COY and —Ar—D, thus

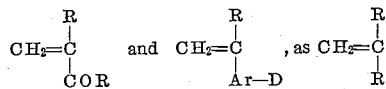

etc., in which $Z^\oplus$ is a positive counter ion, usually a metal, typically an alkali or alkaline earth metal. The propagation step is preceded by an initiating step; and initiation may be brought about in a number of ways.

The anionic polymerization can be initiated by an alkali metal hydride such as NaH, LiH, etc., KH, CsH, KAlH, etc., LiAlH$_4$, etc. Designating such hydrides as MH, then the initiating step is

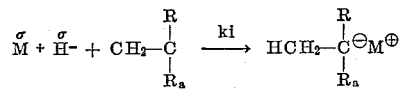

When an alkali metal alkyl is used, the initiating step is given as

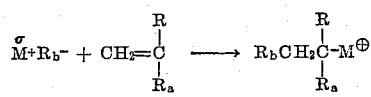

in which the cation $M^{\sigma+}$ represents Li, Na, K, Cs, etc., and the anion $R_b$ represents methyl, ethyl, propyl, isopropyl, butyl, amyl, isoamyl, benzyl, triphenyl methyl, phenyl, naphthyl, octyl, etc., preferably containing no more than 12 carbon atoms in said anion. A few typical examples of $MR_b$ are $(C_6H_5)_3CNa$,

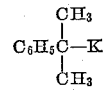

BuLi, $C_6H_5CH_2Cs$, allyl sodium etc.

A Grignard Reagent $R_bMgX$ can also be used to initiate an anionic polymerization, thus

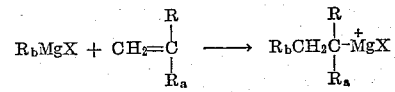

Illustrative examples of $R_bMgX$, wherein $R_b$ is as defined above and X is a halogen, such as in phenyl magnesium bromide, butyl magnesium bromide and chloride, vinyl magnesium bromide, allyl magnesium bromide, etc.

The free alkali metals may also be used to initiate polymerization, especially when the metal, M°, gives up an electron to form an ion radical of the monomer. Thus

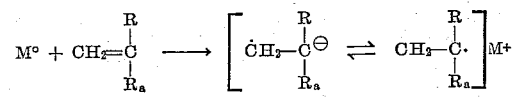

The ion radicals couple to form a dianion, for example,

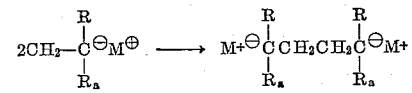

as a step in the initiation mechanism.

A similar mechanism occurs in the anionic initiation using an alkali metal and naphthalene, anthracene, α-methyl styrene tetramer, etc., as illustrated by naphthalene, thus

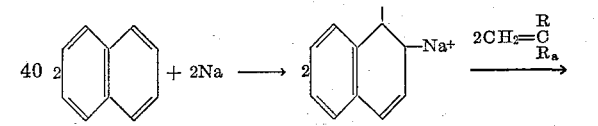

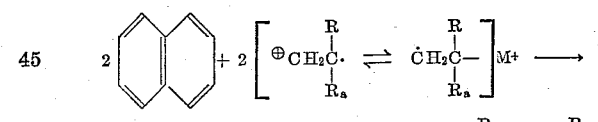

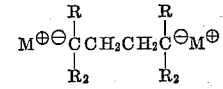

The alkali metals in liquid ammonia are also effective anionic polymerization initiators which may function in either of two ways, e.g., in the case of potassium, sodium or calcium in liquid ammonia the resulting amide functions as the initiator, thus

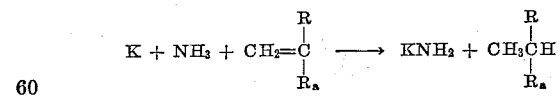

then

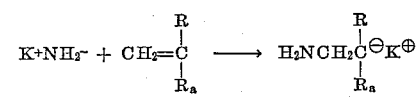

while, in the case of lithium, an ion radical is formed in the reaction which acts as the initiator, thus

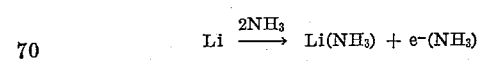

where $e^-$ is an electron thus

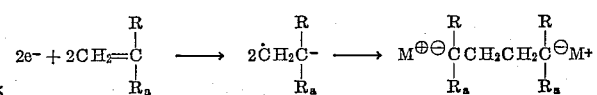

In the ammonia-amide series, the order of reactivity of the cations is given as

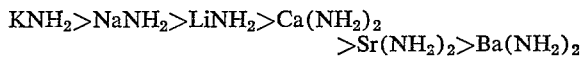
$$>Sr(NH_2)_2>Ba(NH_2)_2$$

In a similar way anionic initiation may be brought about by ketyls which are the reaction products of an alkali or alkaline earth metal with a ketone such as benzophenone, in ether, thus

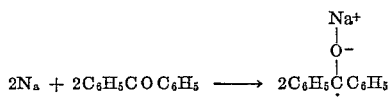

which then reacts with two moles of monomer to form the dianions of the monomers.

The anionic polymerization may be performed with the monomers of this invention, alone or in the presence of a liquid diluent, at temperatures ranging from about −80° C. to about 100° C. or higher, but for most monomers the range of −40° C. to 80° C. is satisfactory; in general, −20° C. to 40° C. is practical. The solvent, or diluents, when used may be selected from the class of aliphatic and aromatic hydrocarbons, ketones, ethers and esters, such as butane, propane, hexane, heptane, octane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether, diethyl-diethylene glycol ether, etc. The diluent or solvent can also act to control the molecular weight of the polymerization by solvolitic chain transfer with the anion when protonic solvents are used, thus

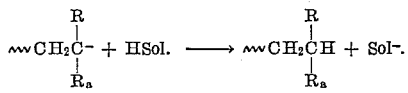

Anionic polymerizations are also referred to as base-catalyzed polymerizations.

For economical use as coating compositions, it is wasteful as well as unnecessary to use homopolymers of the monomers of this invention, since the high activity of polymers having an abundance of pendant

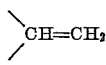

functions in the structures

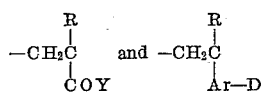

is not needed. However, when a very high amount of crosslinking is required, they are used. In most cases, copolymers are preferred, for economical and technical reasons, having from about 5 to 70% of the structural unit

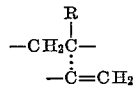

in the copolymer product.

Convertible linear polymers of this type are copolymerized with C monomers, to obtain crosslinked polymers with improved adhesive properties. The C monomers are polymerizable compounds having at least one polymerizable

group and at least one other group, preferably one such group, selected from the class of

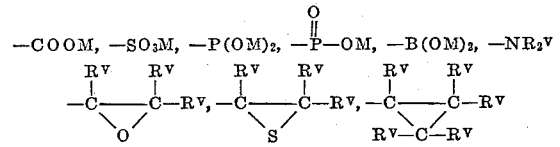

wherein M represents hydrogen, an alkali metal or alkaline earth metal, the ammonium radical or an alkyl-substituted ammonium radical in which the alkyl groups have 1–12 carbon atoms, and $R^V$ is hydrogen or a hydrocarbon radical of 1–12 carbon atoms, or the hydroxy or —COOM derivatives of such hydrocarbon radicals. A few illustrative examples of M are H, Na, Li, K, Cs, Mg, Ca, Sr, Ba, $NH_4^+$,

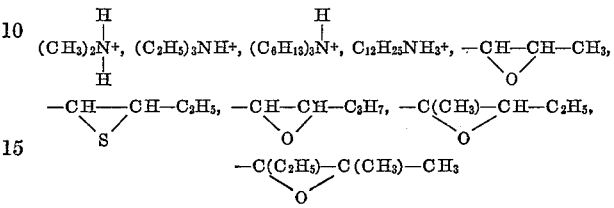

In the C monomers, the specified groups are attached to the polymerizable

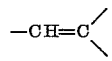

group either directly or through various connecting groups, preferably through a divalent hydrocarbon radical, advantageously arylene or alkylene. Where the valences of the

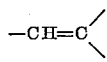

are not occupied by these specified groups they are advantageously occupied by hydrogen, alkyl or aryl groups of no more than 10 carbon atoms. Terminal ethylenic groups, e.g.,

are preferred.

Monomers of class C, in addition to acrylic and methacrylic acid, are illustrated by, but not limited to, the following:

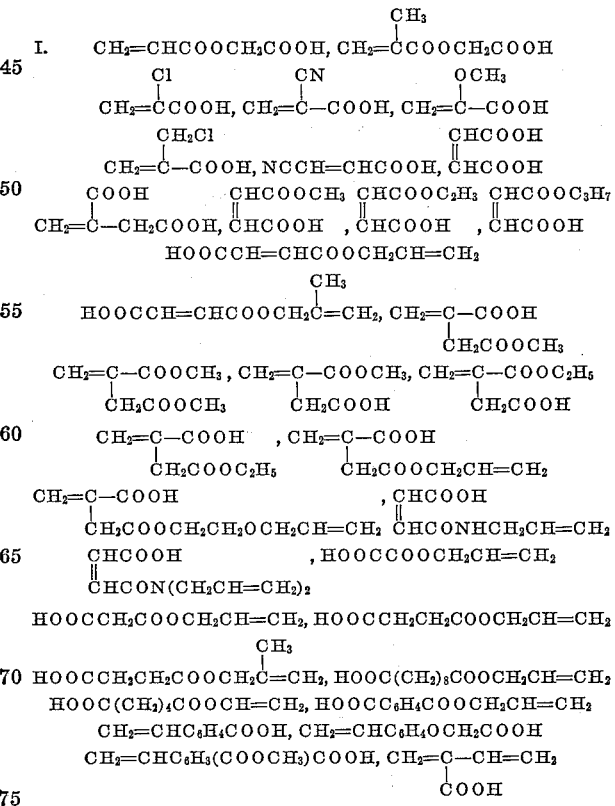

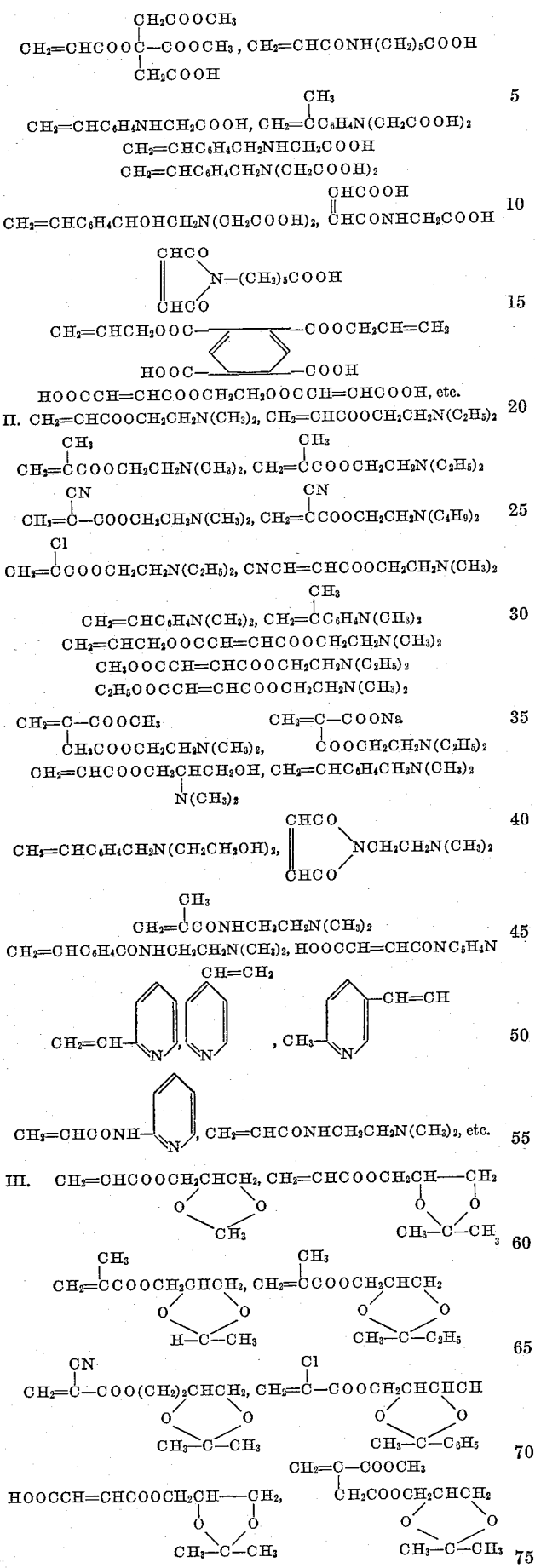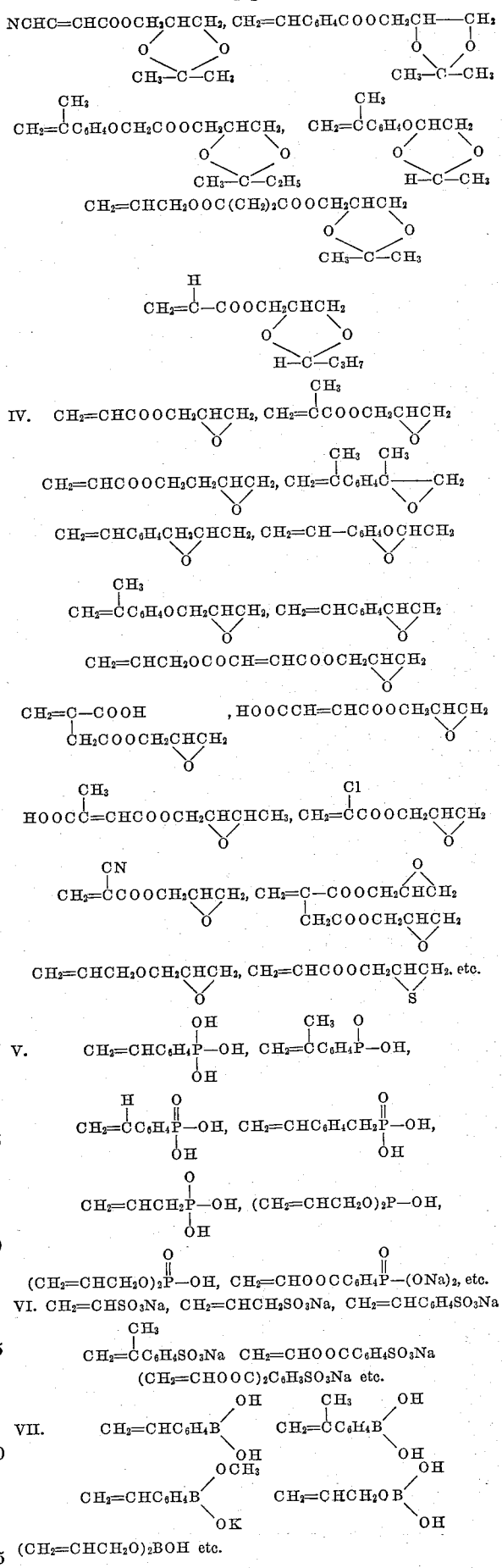

The objectives of this invention, therefore, are achieved, at least in part, by copolymerizing a preformed soluble, fusible polymer having the repeating structural unit,

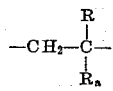

with at least one of the class C monomers. This copolymerization can be performed in the absence or presence of other monomers not contributing to the adhesive properties, such as the monomers listed hereinabove as monomers B. These monomers may be the same as monomers B used initially to prepare the copolymer containing the

containing copolymer. However, since an anionic polymerization is not involved at this stage of the process, a wider variety of monomers may be used in the post copolymerization performed under radical initiation. In many cases, where a solventless adhesive is required, the use of such monomers instead of solvents, is preferred.

Illustrative examples of other monomers containing such groups are the acrylic esters such as methyl acrylate, ethyl acrylate, hexyl acrylate, allyl acrylate, phenyl acrylate, benzyl acrylate, methyl- -chloroacrylate, etc.; the methacrylic esters such as methyl methacrylate, ethyl methacrylate, propyl methacrylate, methallyl methacrylate, ethylene dimethacrylate, etc.; the vinyl esters and ethers, such as vinyl acetate, vinyl stearate, vinyl benzoate, vinyl chloroacetate, divinyl phthalate, divinyl succinate, hydroquinone, divinyl ether, etc.; the polymerizable amides and nitriles such as acrylamide, hydroxymethylacrylamide, methacrylamide, itaconic monoamides, itaconic diamide, acrylonitrile, methacrylonitrile, etc.; the alkenyl aryl compounds such as styrene, o-methyl styrene, p-methyl styrene, -methyl styrene, the chloro-styrenes, divinyl benzene, diallyl benzene, vinyl phenyl allyl ether, etc.; the mono- and polyallyl esters such as allyl acetate, diallyl succinate, diallyl phthalate, diallyl maleate, diallyl fumarate, the allyl and methallyl citrates, malates and tartrates, etc.; the vinylidene compounds such as vinylidene chloride, vinylidene cyanide, methylene malonic esters, etc.; vinylene compounds such as vinylene carbonates, the maleic diesters, the fumaric diesters; the itaconic compounds such as itaconic anhydrides, the itaconic diesters of the lower and higher aliphatic alcohols; the dienes such as 2 carbalkoxy butadiene 1,3; 2-cyano butadiene-1,3; 2-phenyl butadiene 1,3, etc.

The soluble, fusible linear polymers of this invention are converted to the insoluble, infusible state by heat alone or in the presence of oxygen or other deliberately added catalysts, particularly radical generating catalysts, e.g., peroxides, such as benzoyl peroxide, tertiary butyl hydroperoxide, hydrogen peroxide, cyclohexyl peroxide, tertiary butyl peroxide, methyl ethyl ketone peroxide, cumene hydroperoxide, azo catalysts such as 2,2'azo-bis-isobutyronitrile, etc. alone or in the presence of redox agents. Also, they may be crosslinked by U.V. light or other forms of radiation such as high energy radiation and secondary radiations resulting therefrom, such as from electron accelerators, X-ray machines, particle accelerators, cobalt 60 sources, etc., the energies of such radiation corresponding to energies of at least 100,000 electron volts. If discoloration is not important in the particular application of the crosslinked polymer, then Lewis acids such as $AlCl_3$, $H_3PO_4$, $BF_3$, ether, etc. can be used; again, some degradation of the polymer can result from their use, and in such cases, they are undesirable.

The following examples illustrate the practice of this invention.

EXAMPLE I

To 200 parts of freshly distilled anhydrous benzene is added 2.3 parts of micronized sodium and 126 parts of allyl methacrylate under an inert atmosphere at 10° C., and the mixture agitated vigorously. After 10 hours the mixture is neutralized with gaseous HCl, the NaCl removed by filtration and the benzene removed by distillation at 1 mm. and 92.6 parts of polymeric white solid, soluble in benzene, acetone, ethyl acetate, carbon tetrachloride, styrene, ethyl acrylate, divinyl benzene and diallyl phthalate is obtained. Titration with bromine of the polymer indicates the structure

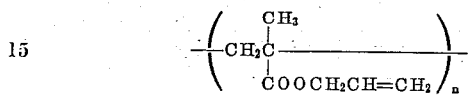

and the intrinsic viscosity in benzene is 0.29, and the molecular weight according to the equation $[\eta]=KM$, where K is $1.3 \times 10^{-5}$, is about 22,000.

EXAMPLE II

Example I is repeated using 11.2 parts of acrylic acid added to the 126 parts of allyl acrylate before the sodium is added. Hydrogen is liberated from the reaction and no polymerization or copolymerization occurs but the formation of $CH_2=CHCOONa$ is observed as a precipitate. Polymerization also fails to occur when an equivalent amount of

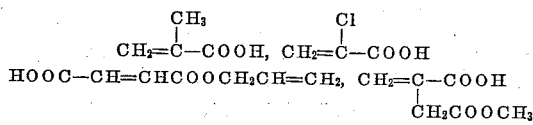

and

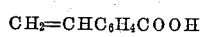

is added.

EXAMPLE III

To 200 parts of anhydrous benzene is added 126 parts of methallyl methacrylate and 12.8 parts of glycidyl acrylate, and 1 part of benzoyl peroxide under an inert atmosphere, and the mixture reacted with agitation at 80° C., and an insoluble, crosslinked, gelled product obtained in 2 hours. Crosslinked gels are also obtained when

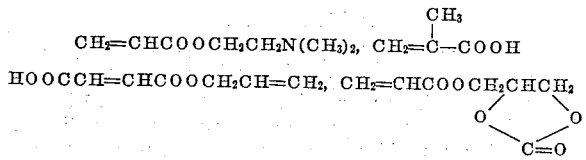

and

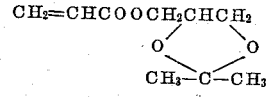

are used in amounts equivalent to glycidyl acrylate. When one part of cationic initiator $BF_3 \cdot C_2H_5OC_2H_5$ is used instead of the benzoyl peroxide, then crosslinked polymers are also obtained.

EXAMPLE IV

The mixture of Example III of benzene, methallyl methacrylate and glycidyl acrylate are reacted at a reflux temperature of about 80° C. with 2.3 parts of sodium and a gelled product is obtained at the end of 4 hours. When the glycidyl acrylate is omitted from the mixture a soluble, fusible product of molecular weight of about 4000 is obtained.

EXAMPLE V

Ten parts of the polymer of Example I are dissolved in 25 parts of toluene and the solution is flowed onto a glass plate and heated at 100° C. for 2 hours, then baked at 180° C. for 1 hour. A clear, hard, colorless film is obtained which is no longer soluble in the original toluene. The film, however, can, when cooled, be readily scraped away from the glass. When 0.1 part of benzoyl peroxide is added to the solution before curing, accelerated curing can be obtained at 130–160° C. When metal plates of iron, steel, or copper or aluminum are used instead of glass plates, cured, insoluble films are also obtained, but the adhesion is poor and can be removed by flexing the sheet.

EXAMPLE VI

Example I is repeated using 119.7 parts of methyl methacrylate and 6.3 parts of allyl methacrylate instead of 126 parts of allyl methacrylate, and a 95:5 copolymer of approximately the same viscosity is obtained.

EXAMPLE VII

Example I is repeated using 113.4 parts of methyl methacrylate and 12.6 parts of allyl methacrylate instead of 126 parts of allyl methacrylate and a 90–10 copolymer of approximately the same viscosity is obtained.

EXAMPLE VIII

Example I is repeated using 63 parts of methyl methacrylate and 63 parts of allyl methacrylate instead of 126 parts of allyl methacrylate and a 50–50 copolymer of approximately the same viscosity is obtained.

EXAMPLE IX

Example I is repeated using 31.5 parts of methyl methacrylate and 94.5 parts of allyl methacrylate instead of 126 parts of allyl methacrylate and a 25–75 copolymer of approximately the same viscosity is obtained.

EXAMPLE X

Example I is repeated using 6.3 parts of methyl methacrylate and 119.7 parts of allyl methacrylate instead of 126 parts of allyl methacrylate, and a 5–95 copolymer of approximately the same viscosity is obtained.

EXAMPLE XI

Examples I, VI, VII, VIII, and IX are repeated using instead of sodium an equivalent amount of K, Li, BuLi, $NaNH_2$, $KNH_2$, NaH, $LiAlH_4$, sodium naphthalene, sodium benzophenone, and soluble, fusible linear polymers are obtained in all cases.

EXAMPLE XII

To 1000 parts of anhydrous benzene is added 112 parts of allyl acrylate and 0.12 part of micronized sodium under an inert atmosphere with agitation at 0° C. for 72 hours, then allowed to come to room temperature and diluted with 1000 parts addition of benzene and filtered to remove unreacted initiator. To this solution is added 5.8 parts of glacial acetic acid and the precipitated sodium acetate removed by filtration and concentrated to a soft gummy polymer by distillation at 0–5° C. at 2–5 mm. pressure, and 87 parts of polymer isolated which, on analysis, gives values of 64.21% C. and 7.16% H., which is in good agreement with the theoretical values for the polymer,

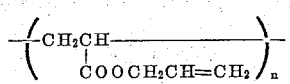

which is confirmed by titration with bromine to the polymer

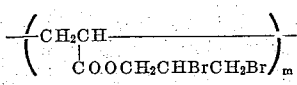

EXAMPLE XIII

Twenty parts of allyl acrylate and 80 parts of butyl methacrylate are added to 100 parts of anhydrous benzene containing 1 part of sodium dispersion and allowed to react in an inert atmosphere with stirring at 25° C. for 18 hours. There is then added 3 parts of glacial acetic acid and 100 parts of benzene and the sodium acetate precipitate removed by filtration. One-half of the solution is kept as prepared and the remainder is concentrated at 0° C. at 1–2 mm. pressure and 49.2 parts of solid copolymer isolated, which is soluble in dioxane, acetone, carbon tetrachloride, benzene, toluene, and xylene.

EXAMPLE XIV

Example I is repeated, using instead of 126 parts of allyl methacrylate, the indicated amounts of the following monomers (a) 126 parts, $CH_2=CHCOOCH_2\underset{\underset{CH_3}{|}}{C}=CH_2$ (b) 126 parts, $CH_2=CHCOO\underset{\underset{CH_3}{|}}{C}HCH=CH_2$ (c) 140 parts, $CH_2=\underset{\underset{CH_3}{|}}{C}-COOCH_2\underset{\underset{CH_3}{|}}{C}=CH_2$ (d) 156 parts, $CH_2=\underset{\underset{CH_3}{|}}{C}COOCH_2CH_2OCH=CH_2$ (e) 156 parts, $CH_2=CHCOOCH_2CH_2OCH_2CH=CH_2$ (f) 175 parts, $CH_2=\underset{\underset{CH_3}{|}}{C}CON(CH_2CH=CH_2)_2$ (g) 160 parts, $CH_2=CHC_6H_4OCH_2CH_2CH_3$ (h) 188 parts, $CH_2=\underset{\underset{CH_3}{|}}{C}C_6H_4OCH_2\underset{\underset{CH_3}{|}}{C}=CH_2$ plus 10 parts tetrahydrofurane (i) 137 parts, $CH_2=\underset{\underset{CN}{|}}{C}-COOCH_2CH=CH_2$ ( ) 254 parts, $CH_2=CHC_6H_4SO_2OCH_2CH=CH_2$ (k) 174 parts, $CH_2=CHC_6H_4COOCH=CH_2$ (l) 188 parts, $CH_2=CHC_6H_4COOCH_2CH=CH_2$ (m) 216 parts, $CH_2=\underset{\underset{CH_3}{|}}{C}C_6H_4COOCH_2\underset{\underset{CH_3}{|}}{C}=CH_2$ plus 10 parts tetrahydrofurane and in all cases soluble, fusible polymers are obtained.

EXAMPLE XV

The procedure of Example XII is repeated thirteen times using 20 parts of each of the monomers of Example XIV with 80 parts of various other monomers as listed below.

20 parts monomer XIVa, plus 80 parts $CH_2=\underset{\underset{CN}{|}}{C}-COOCH_3$ 20 parts monomer XIVb, plus 80 parts $CH_2=CHOOCH_2C_6H_4OCH_3$ 20 parts monomer XIVc, plus 80 parts $CH_2=\underset{\underset{CH_3}{|}}{C}C_6H_5$ + 10 parts tetrahydrofurane 20 parts monomer XIVd, plus 80 parts $CH_2=\underset{\underset{CH_3}{|}}{C}COOCH_2CH_2CN$ 20 parts monomer XIVe, plus 80 parts $CH_2=\underset{\underset{CH_3}{|}}{C}COSC_2H_5$ 20 parts monomer XIVf, plus {40 parts $CH_2=CHCOOCH_3$ / 40 parts $CH_2=CHCON(CH_3)_2$}

20 parts monomer XIVg, plus 80 parts $CH_2=CHC_6H_5$ 20 parts monomer XIVh, plus 80 parts $CH_2=\underset{\underset{CH_3}{|}}{C}C_6H_5$ + 10 parts tetryhydrofurane 20 parts monomer XIVi, plus 80 parts $CH_2=\underset{\underset{CN}{|}}{C}-COOC_4H_9$ 20 parts monomer XIVj, plus 80 parts CH₂=CHC₆H₄OCH₃

20 parts monomer XIVk, plus 80 parts CH₂=CHC₆H₅.

20 parts monomer XIVl, plus { 60 parts CH₂=CHCOOC₆H₅ ; 20 parts CH₂=CHC₆H₅ }

20 parts monomer XIVm, plus tetrahydrofurane { 40 parts CH₂=CHC₆H₅ ; 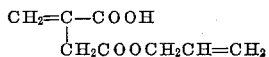 + 10 parts ; 40 parts CH₂=C—C₆H₅ } and almost quantitative yields of copolymers are obtained in all cases.

EXAMPLE XVI

To five separate samples of polymer solution of Example V containing 10 parts polymer and 0.1 part of benzoyl peroxide in 25 parts of toluene is added 0.05 (0.5%), 0.1 (1%), 0.5 (5%), 1.0 (10%), and 2.0 (20%) part of allyl monoitaconate,

CH₂=C—COOH
  |
  CH₂COOCH₂CH=CH₂ and films prepared on freshly sanded iron, steel, copper, and aluminum sheets and cured at 160° C. for two hours. In all cases, the film yield is quantitative and the bonds are excellent compared to the unmodified films of Example V. When acrylic and methacrylic acid are used instead of the itaconic ester of this example, good bonds are also obtained but due to the volatility of these acids lower film yields are obtained, as for example, with 2 parts of acrylic and methacrylic acid, the yields respectively are 93.6% and 96.8% compared to 100% for the less volatile itaconic acid ester.

EXAMPLE XVII

The procedure of Example XVI is repeated using instead of allyl monoitaconate, 1 part of each of the following modifying monomers, HOOCCH=CHCOOC₂H₅,

CH₂=CHCH₂OOCCH=CHCOOH

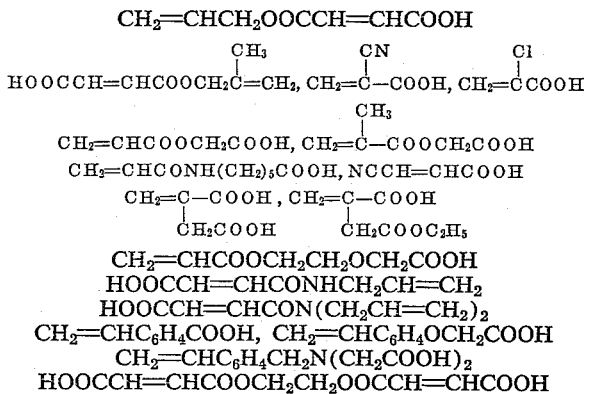

CH₂=CHCOOCH₂CH₂OCH₂COOH
HOOCCH=CHCONHCH₂CH=CH₂
HOOCCH=CHCON(CH₂CH=CH₂)₂
CH₂=CHC₆H₄COOH, CH₂=CHC₆H₄OCH₂COOH
CH₂=CHC₆H₄CH₂N(CH₂COOH)₂
HOOCCH=CHCOOCH₂CH₂OOCCH=CHCOOH and improved bonding is noted in all cases.

EXAMPLE XVIII

The procedure of Example XVI is repeated using instead of the polymer of Example V, the polymers and copolymers of Examples VI to X inclusive, and of Examples XII to XV inclusive, and in all cases improved bonding is found.

EXAMPLE XIX

To two separate samples of polymer solution of Example V containing benzoyl peroxide is added 0.1 part (1%) and 2.0 parts (20%) of glycidyl acrylate and films prepared on freshly sanded and surface oxidized sheets of iron, copper, brass, aluminum, and cured at 160° C. for 2 to 3 hours. Improved bonding is found over the unmodified polymer. The copolymer with the higher amounts of glycidyl acrylate shows better adhesion than the polymer containing the smaller amounts of modifier. In this example, the glycidyl acrylate is illustrative of a monomer containing an oxirane ring and similar improvements are obtained when, instead of glycidyl acrylate, there is used the monomers,

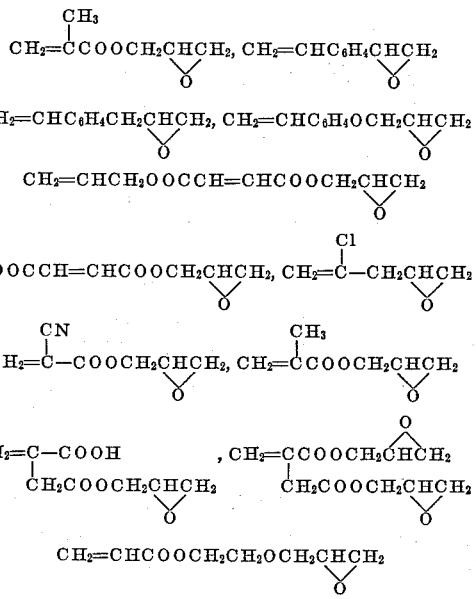

and

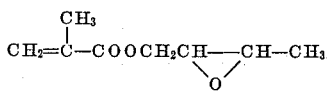

respectively. These copolymers also exhibit excellent adhesion to glass and ceramic products.

EXAMPLE XX

Example XIX is repeated using instead of glycidyl acrylate the monomer

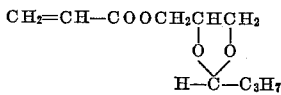

and the resulting films exhibit tenacious adhesion to cellulose, metals and especially to glass. When the monomer of this example, used primarily to illustrate this class of monomers, is replaced by the following related monomers, similar improvements are obtained, as for example, with

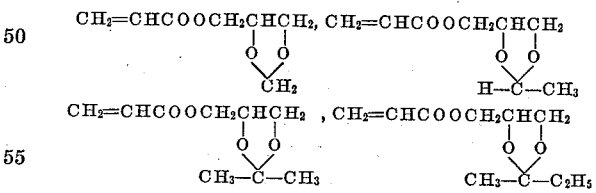

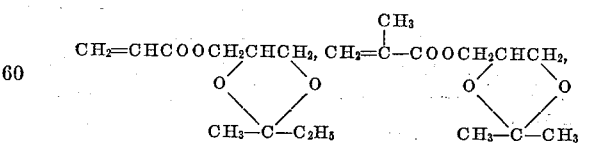

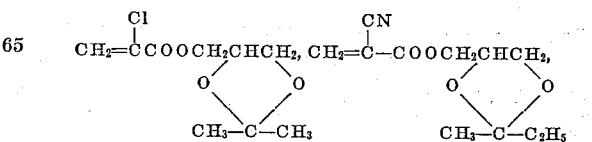

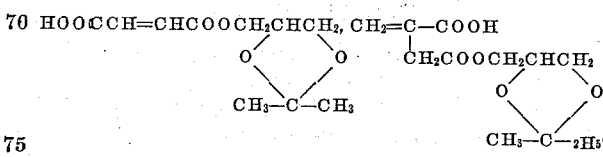

$CH_2=CHCH_2OOCCH=CHCOOCH_2CHCH_2$,

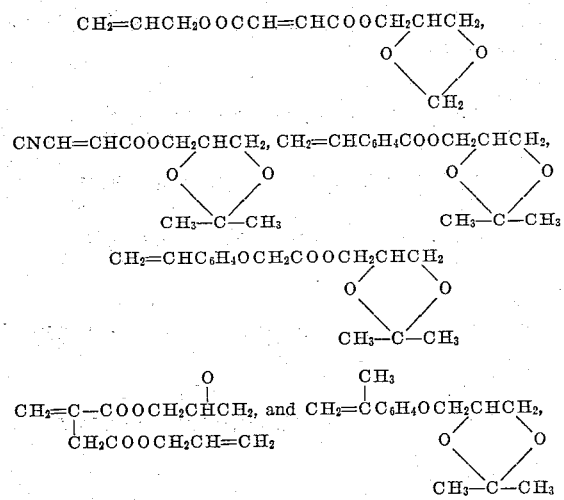

respectively.

EXAMPLE XXI

Example XIX is repeated using instead of glycidyl acrylate, $CH_2=CHCOOCH_2CH_2N(CH_3)_2$ and the resulting films exhibit great adhesion to metals, glass, ceramics, and especially to cellulose products. Similarly, improved properties are obtained when the N,N-dimethylaminoethyl acrylate is replaced by the monomers $CH_2=CHCOOCH_2CH_2N(C_2H_5)_2$, $CH_2=CHCOOCH_2CH_2N(C_3H_7)_2$,

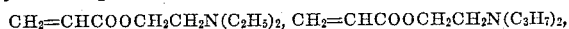

$CNCH=CHCOOCH_2CH_2N(CH_3)_2$, $CH_2=CHCONHCH_2CH_2N(CH_3)_2$, $CH_2=CHC_6H_4N(CH_3)_2$, $CH_2=CHCH_2OOCCH=CHCOOCH_2CH_2N(CH_3)_2$, $CH_3OOCCH=CHCOOCH_2CH_2N(C_2H_5)_2$,

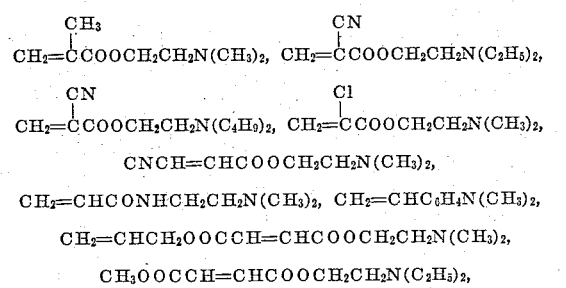

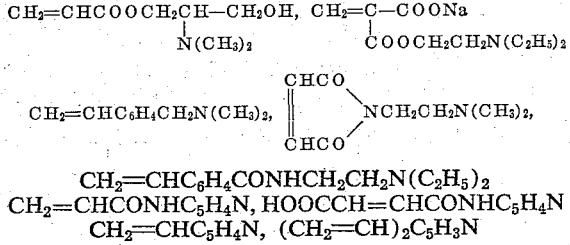

$CH_2=CHC_6H_4CONHCH_2CH_2N(C_2H_5)_2$
$CH_2=CHCONHC_5H_4N$, $HOOCCH=CHCONHC_5H_4N$
$CH_2=CHC_5H_4N$, $(CH_2=CH)_2C_5H_3N$ and $CH_2=CHC_5H_3N(CH_3)$ respectively.

EXAMPLE XXII

The procedure of Example XIX is repeated using instead of the polymer of Example V the polymers and copolymers of Examples VI to X inclusive, and of Examples XII to XV inclusive, and improved bonding is observed in all cases.

EXAMPLE XXIII

The procedure of Example XX is repeated using instead of the polymer of Example V the polymers and copolymers of Examples VI to X inclusive and of Examples VII to XV inclusive and similar improvement in bonding is found.

EXAMPLE XXIV

The procedure of Example XXI is repeated using instead of the polymer of Example V, the polymers and copolymers of Examples VI to X inclusive, and of Examples XII to XV inclusive and similar results are obtained.

EXAMPLE XXV

Example XIX is repeated using instead of glycidyl acrylate and toluene solvent, acetone solvent and the monomer $CH_2=CHC_6H_4SO_3Na$, and improved adhesion is found in the films.

EXAMPLE XXVI

Example XIX is repeated using the monomer $CH_2=CHC_6H_4B(OH)_2 \cdot (CH_3)_3N$ with the polymer in acetone instead of glycidyl acrylate in toluene and improved adhesion of the film to the glass and metal plates is found.

EXAMPLE XXVII

To 10 parts of the polymer of Example VII in 30 parts of acetone is added 1.0 part of allyl maleate, $HOOCCH=CHCOOCH_2CH=CH_2$ and 0.1 part of benzoyl peroxide, and a film cast on two aluminum strips, and the films dried at 60° C. to remove acetone. The coated sides of the sheets are placed in contact with each other, pressure of 100 p.s.i. applied to the sheets, and then heated at 140° C. for 20 minutes. Excellently bonded sheets are obtained.

EXAMPLE XXVIII

The procedure of Example XXVII is repeated using 10 parts of the polymer of Example VIII and similar results are obtained with heat-resistant properties greatly improved over the product of Example XXVII due to the greater number of crosslinkages in the polymer.

EXAMPLE XXIX

To the procedure of Example XXVII is repeated using, however, instead of acetone solvent, 20 parts of t-butyl acrylate to produce a "solventless" polymerizable mixture, and the solution cast on one strip of the metal, over which was laid an uncoated strip and the assembly heated at 90° C. for 3 hours under contact pressure alone. An excellently bonded laminate is obtained.

EXAMPLE XXX

The procedure of Example XXIX is repeated using instead of the t-butyl acrylate, 20 parts of commercial divinyl benzene containing 50—50 mixture of divinyl benzene and ethyl vinyl benzene, and a more resistant bond is obtained than that of Example XXIX. Similar results are obtained when the divinyl benzene is replaced by allyl methacrylate, glycol dimethylacrylate, diallyl itaconate, diallyl fumarate, divinyl phthalate, diallyl phthalate, and diallyl succinate.

EXAMPLE XXXI

To 50 parts of commercial divinyl benzene (50% divinyl benzene-50% ethyl vinyl benzene) containing 0.6 parts of benzoyl peroxide is added, 25 parts of the copolymer 1 of Example XV and 5 parts of $CH_2=CHCOOCH_2CH_2N(C_2H_5)_2$ and the mixture stirred until a homogeneous, viscous mixture is obtained. A glass mat, 6" x 6", is impregnated with the mixture and laid between two sheets of polyvinyl alcohol film backed by rigid metal platens, and the lay-up placed in an oven at 100° C. for 2 hours and heated to 130° C. for 4 hours, resulting in a rigid heat-resistant panel in which the polymer is well bonded to the glass reinforcement.

EXAMPLE XXXII

Glass-woven fabric is dip-treated with the polymer solution of Example XXII previously diluted with 50 parts of toluene so that the pick-up on the glass fabric is about 3% and the fabric is then dried at 100° C. to remove most of the solvent and cured at 150° C. for 10 minutes. The polymer sized fabric is then converted to a glass laminate by stacking 4 sheets of fabric previously impregnated with commercial, liquid unsaturated polyester resin (50% styrene-50% phthalic modified glycol maleate containing 0.5% peroxy catalyst) between metal platens which are coated with zinc stearate, and the assembly cured at 120° C. for 4 hours. The bond between the cured polyester and the glass fibers is better than similar laminates prepared from glass fabric which had not been sized with the cured, modified polymers of this invention.

EXAMPLE XXXIII

Knurled brass inserts are dipped in the polymer solution of Example XXII, dried and baked at 125° C. for 6 hours, and then commercial polystyrene molded around them in an injection molding machine. The bond between the polystyrene and the brass insert is greater than when untreated brass inserts are used.

EXAMPLE XXXIV

To a mixture of 35 parts of toluene and 5 parts of acetone is added 15 parts of the polymer of Example VII, 7 parts of the polymer of Example VIII, 3 parts of monoallyl itaconate, and 0.5 part of 2,2′-azobisisobutyronitrile, and the mixture stirred until homogeneous. The inside of a clean iron pipe of 3″ I.D. is centrifugally spray-coated while the pipe, heated to 80° C., is rotated, and the solvent allowed to evaporate and the temperature raised to 170° C., and curing obtained in about six minutes. A solvent resistant, heat resistant internally coated pipe of good quality is obtained.

EXAMPLE XXXV

Continuous strips of aluminum are coated with the polymer solution of Example XXVII and dried at 60° C. The solvent-dried but uncured strips are fabricated into cans by the process of U.S. Patent 2,982,457, May 2, 1961, and after forming are clamped while on the mandrel and heated to 200° C. for 30 seconds and heat-resistant bonded tubular laminated cans are obtained. When the treated strips are spiral wound and then heat treated, as in the making of the can, continuous pipe is produced. Similar results are obtained when copper, iron, silver, etc. metals are processed in the same way.

EXAMPLE XXXVI

An enamel is produced by adding milled $TiO_2$ pigment to the polymer solution of Example XXI so that the pigment-binder ratio is 60:40 and the face of surface-ground concrete blocks are then coated with the varnish, the solvent allowed to evaporate at 60° C., then the coated blocks are heated under infrared lamps at 180° C. for 15 minutes in a continuous oven, and a porcelain-like finish which is water, heat and solvent resistant is obtained. A similar finish and excellent bonding is obtained on oak, maple, cedar, pine, and mahogany panels, as well as on fiber boards, asbestos panels, and concrete castings.

EXAMPLE XXXVII

A solvent mixture is prepared from 10 parts of the polymer of Example VII, 4 parts of diethyl itaconate, 6 parts of diallyl itaconate, 1 part of allyl mono-itaconate, and 0.3 part of benzoyl peroxide and 16 parts of carbon black (printing ink grade) and the mixture milled to uniformity and used as a printing ink on paper. After the ink is impressed on the paper sheet, it is passed under a bank of infrared lamps at 120–140° C. and setting occurs in less than a minute.

While the $(CH_2)_n$ group is preferred in the compounds of this invention other divalent aliphatic groups having side branches can also be used, preferably only one or two methyl or ethyl side branches. Therefore the $(CH_2)_n$ portion of the formula can be represented as —Z— which is defined as an alkylene radical having no more than six carbon atoms therein. Such alkylene radicals include the following typical branched radicals

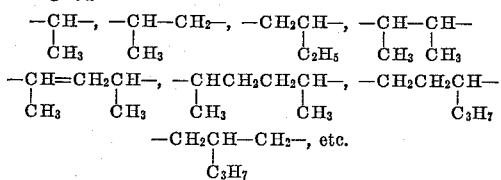

—CH$_2$CH—CH$_2$—, etc.
  |
  C$_3$H$_7$

In the groups

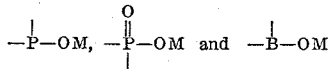

the open valencies are occupied by a group selected from the class consisting of —OM and a hydrocarbon radical having an ethylenic polymerizable group. In the

group the open valencies are occupied by a radical selected from the class consisting of hydrogen and hydrocarbon radicals of no more than 12 carbon atoms.

While certan features of this invention have been described in detail with respect to various embodiments thereof, it will, of course, be apparent that other modifications can be made within the spirit and scope of this inventon and it is not intended to limit the invention to the exact details shown above except insofar as they are defined in the following claims.

The invention claimed is:

1. A polymerizable mixture adapted for the preparation of copolymers of improved adhesiveness comprising
    (1) about 80 to 99.5% of a preformed linear polymer formed by anionic polymerization containing the structural unit

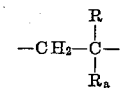

wherein R is a radical selected from the class of H, —CH$_3$, and —CN; R$_a$ is selected from the class of ber selected from the class of

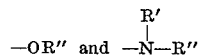

—Ar— represents an arylene radical containing six to twelve carbon atoms; D represents a radical selected from the class of —Y, —COY, —(CH$_2$)$_n$Y, —(CH$_2$)$_n$COY, in which $n$ represents a numerical value of 1 to 6, R′ is a radical having one to ten carbon atoms selected from the class of hydrocarbon, alkenyloxyalkyl, alkenylthioalkyl, alkenyloxyaryl, and alkenylthioaryl radicals, said alkenyl radical containing at least three carbon atoms, and R″ is a radical having three to ten carbon atoms selected from the class of alkenyl, alkenylaryl, alkenyloxyalkyl, alkenylthioalkyl, alkenyloxyaryl, and alkenylthioaryl radicals, said R″ radicals having a terminal

grouping, and
    (2) about 0.5 to 20% of at least one monomer containing (a) at least one ethylenic polymerizable group and (b) at least one other group selected from the class of —COOM, —SO$_3$M

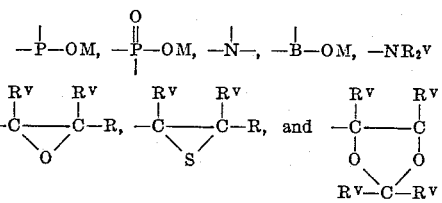

wherein M is selected from the class consisting of hydrogen, alkali metals, alkaline earth metals and the ammonium group —NR$_4^V$, and R$^V$ represents hydrogen, hydrocarbon radicals of one to twelve carbon atoms and the hydroxy and —COOM derivatives of such hydrocarbon radicals, in which

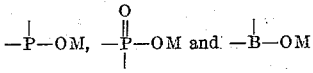

groups the open valencies are occupied by a group selected from the class consisting of —OM and a hydrocarbon radical having an ethylenic polymerizable group, and in which

groups the open valencies are occupied by a radical selected from the class consisting of hydrogen and hydrocarbon radicals of no more than 12 carbon atoms.

2. The insoluble, infusible copolymer of the polymerizable mixture of claim 1.

3. The copolymer of claim 2 in which the repeating unit for the polymer is

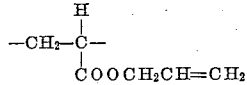

4. The copolymer of claim 3 in which the (2) monomer is

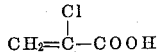

5. The copolymer of claim 3 in which the (2) monomer is

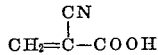

6. The copolymer of claim 3 in which the (2) monomer is HOOCCH=CHCOOCH$_2$CH=CH$_2$.

7. The copolymer of claim 3 in which the (2) monomer is

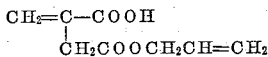

8. The copolymer of claim 3 in which the (2) monomer is

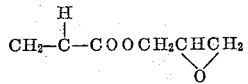

9. The copolymer of claim 3 in which the (2) monomer is

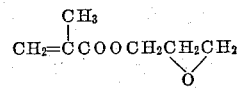

References Cited
UNITED STATES PATENTS

| | | | |
|---|---|---|---|
| 2,500,265 | 6/1946 | Walling et al. | 260—89.5 |
| 2,760,886 | 8/1956 | Prentiss et al. | 117—72 |
| 2,816,093 | 12/1957 | Coover | 260—78.5 |
| 2,884,126 | 4/1959 | Ulrich | 206—59 |
| 2,958,673 | 1/1960 | Jen | 260—885 |
| 3,100,758 | 8/1963 | Ravve et al. | 260—836 |
| 3,247,174 | 4/1966 | Breitenbach et al. | 260—885 |
| 3,296,225 | 1/1967 | Warrall | 260—80.5 |

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,364,282

January 16, 1968

Gaetano F. D'Alelio

It is hereby certified that error appears in the above numbered patent requiring correction and that the said Letters Patent should read as corrected below.

Column 26, line 42, after "of" insert -- -COY and -Ar-D, wherein Y represents a mem- --; column 28, lines 11 to 13, the formula should appear as shown below instead of as in the patent:

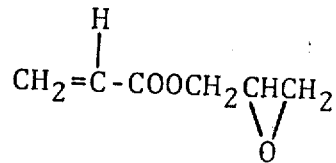

Signed and sealed this 25th day of February 1969.

(SEAL)
Attest:

Edward M. Fletcher, Jr.
Attesting Officer

EDWARD J. BRENNER
Commissioner of Patents